United States Patent
Teevan et al.

(10) Patent No.: US 10,813,362 B2
(45) Date of Patent: Oct. 27, 2020

(54) INSECT REPELLENT AND INSECTICIDE

(71) Applicant: Operation Organic LLC, Memphis, TN (US)

(72) Inventors: Neil B. Teevan, Memphis, TN (US); Lanny Weaver, Garnet Valley, PA (US)

(73) Assignee: Operation Organic LLC, Memphis, TN (US)

( * ) Notice: Subject to any disclaimer, the term of this patent is extended or adjusted under 35 U.S.C. 154(b) by 0 days.

(21) Appl. No.: 16/294,140

(22) Filed: Mar. 6, 2019

(65) Prior Publication Data

US 2019/0274314 A1    Sep. 12, 2019

Related U.S. Application Data

(60) Provisional application No. 62/639,123, filed on Mar. 6, 2018.

(51) Int. Cl.

| | | |
|---|---|---|
| *A01N 65/44* | (2009.01) | |
| *A01N 65/18* | (2009.01) | |
| *A01N 65/22* | (2009.01) | |
| *A01N 31/02* | (2006.01) | |
| *A01N 65/06* | (2009.01) | |
| *A01N 65/00* | (2009.01) | |
| *A01N 37/14* | (2006.01) | |
| *A01N 49/00* | (2006.01) | |

(52) U.S. Cl.
CPC ............. *A01N 65/44* (2013.01); *A01N 31/02* (2013.01); *A01N 37/14* (2013.01); *A01N 49/00* (2013.01); *A01N 65/00* (2013.01); *A01N 65/06* (2013.01); *A01N 65/18* (2013.01); *A01N 65/22* (2013.01)

(58) Field of Classification Search
None
See application file for complete search history.

(56) References Cited

U.S. PATENT DOCUMENTS

| | | | |
|---|---|---|---|
| 2008/0069785 A1* | 3/2008 | Jones | A01N 37/02 424/59 |
| 2009/0099022 A1 | 4/2009 | Fernandez et al. | |
| 2013/0295153 A1 | 11/2013 | Miresmailli et al. | |
| 2014/0050809 A1 | 2/2014 | Angone | |

FOREIGN PATENT DOCUMENTS

WO    2017/027836    2/2017

OTHER PUBLICATIONS

Stop the Bites TM Mosquito & Tick Control Insecticide Concentrate, Stop the Bites TM, 2018, Retrieved on May 15, 2019, Retrieved from the Internet: URL: https://www.stopthebitesmc.com/insecticide-concentrate, pp. 1-7.
Gurunathan Abinaya, et al., "Evaluation of Mosquito Repellent Activity of Isolated Oleic Acid, Eicosyl Ester from Thalictrum Javanicum", Indian Journal of Pharmaceutical Sciences, 2016, vol. 78, No. 1, pp. 103-110.
Oyedele, A.O., et al., "Formulation of an Effective Mosquito-Repellent Topical Product from Lemongrass Oil", Phytomedicine, 2002, vol. 9, pp. 259-262.
International Search Report relating to co-pending PCT International Application No. PCT/US2019/020946, dated May 31, 2019—3 Pages.
Written Opinion relating to co-pending PCT International Application No. PCT/US2019/020946, dated May 31, 2019—5 Pages.

* cited by examiner

*Primary Examiner* — Sin J Lee
(74) *Attorney, Agent, or Firm* — McCarter & English, LLP

(57) ABSTRACT

The present disclosure relates to a composition that includes lemongrass, castor oil, cedarwood oil, geraniol, sodium laurel sulfate, and corn oil for repelling and killing mosquitos. In one aspect of the inventive compositions comprise Guatemalan lemongrass, *Juniperus virginiana* and cedarwood oil. Some compositions further comprise mint oil, e.g., and Montana mint oil. Compositions according to the inventive subject matter kill insects at multiple stages in their life cycle including adult insects, larvae, and disrupt the egg cycle. In another aspect, the inventive compositions repel insects and retain repellency and insecticidal potency over a longer period of time than other natural insect repellents.

20 Claims, No Drawings

INSECT REPELLENT AND INSECTICIDE

RELATED APPLICATIONS

This application claims priority to U.S. Provisional Patent Application No. 62/639,123 filed on Mar. 6, 2018, the contents of which are incorporated herein by reference in their entirety.

BACKGROUND

Insect pests can be detrimental to human health and livestock by spreading diseases. Insect pests can also damage crops, landscaping, buildings, and be a nuisance. For example, mosquitos feed on the blood of various vertebrate hosts, including mammals, birds, reptiles, amphibians, and fish. Mosquito bites are a nuisance, because mosquito saliva causes an itchy rash. More problematic is that mosquitos are vectors for diseases including Zika virus, West Nile virus, Chikungunya virus, dengue, and malaria.

Another insect pest, ticks, are small arachnids that primarily feed on the blood of mammals and birds. Ticks live in grass, tress, shrubs, and piles of leaves and are more common in areas with sandy soil, hardwood trees, rivers, and deer. Although many tick bites are harmless, tick bites in humans and their pets can cause allergic reactions, including alpha-gal syndrome, and spread Lyme disease, Rocky Mountain spotted fever, Colorado tick fever, tularemia, and ehrlichiosis, for example. Although insecticides can reduce mosquito populations, concerns regarding potential toxicity and adverse health effects in humans, pets, and non-target wildlife have prompted a search for naturally sourced repellents and insecticides that do not pose health risks.

Citronella-based insect repellents are widely used. Citronella is a major component of lemongrass oil, and lemongrass oil has been incorporated into topical repellents that exhibit repellency similar to synthetic repellents. See e.g., A. O. Oyedelea, A. A. Gboladeb, M. B. Sosanc, F. B. Adewoyind, O. L. Soyeluc, O. O. Orafidiya. *Formulation of an effective mosquito-repellent topical product from Lemongrass oil*. Volume 9, Issue 3 PHYTOMEDICINE Pages 259-262 (2002). In addition to repelling mosquitos, lemongrass oil exhibits insecticidal effects against ants, fleas, ticks, termites, and dust mites. Lemongrass oil also demonstrates anti-larval activity.

Natural pest control products include Essentria® IC-3 Insecticide Concentrate by Zoëcon® Professional Products and NatureShield® Insect & Pest Repellant by American Hydro Systems®. The active ingredients of Essentria® IC-3 Insecticide Concentrate are rosemary oil, geraniol, and peppermint oil. The label of Essentria® IC-3 Insecticide Concentrate sates that it controls ants, bed bugs, cockroaches, fleas, flies, mosquitos, occasional invaders, spiders, ticks, wasps and 30 other pests. NatureShield® Insect & Pest Repellant uses different active ingredients including garlic oil, cinnamon oil, castor oil, and cedar oil to control mosquitoes, ticks, fleas, ants, carpenter ants, centipedes, cockroaches, gnats, fire ants, silverfish and other crawling and flying insects.

However, these formulations suffer from numerous disadvantages including inadequate repellency. These natural insect repellents also fail to persist after application and either loose their repellency or require frequent application. Thus, there remains a need for compositions that efficiently repel and kill mosquitos at each life cycle stage, and that retain activity after application.

SUMMARY

The present disclosure is directed to mosquito repellent compositions comprising: about 0.05% to 8% by weight lemongrass oil; about 0.05% to about 10% by weight castor oil; about 0.05% to about 7% by weight cedarwood oil; about 0.05% to about 6% by weight geraniol; about 0.01% to about 4% by weight sodium lauryl sulfate; about 0.01% to about 8% by weight mint oil; and about 0.05% to about 2% by weight corn oil. In a preferred embodiment, the lemongrass comprises Guatemalan lemongrass. Preferably, the cedarwood oil comprises *Juniperus virginiana* cedarwood oil. In yet further preferred embodiments, the mint oil comprises Montana mint oil. Contemplated mosquito repellents further include inactive ingredients, such as oleic acid (about 0.01-8% by weight), soap (about 0.05-10% by weight), monolaurin (about 0.05-8% by weight), and water (about 70-80% by weight). Ranges disclosed herein are inclusive of their endpoints.

The present disclosure is further directed to mosquito repellents, wherein the mint oil comprises about 0.01% to about 8% by weight wintergreen and/or spearmint oil.

The present disclosure is also directed to the above mosquito repellents further comprising about 0.01% to about 5% by weight garlic oil and/or about 0.01% to 10% by weight oleic acid.

The present disclosure is further directed to the above mosquito repellents that include about 0.05% to about 15% by weight soap, such as potassium oleate. Optionally, mosquito repellents can further comprise monoglycerides, such as monolaurin.

The present disclosure is further directed to the above mosquito repellents can further comprise inactive ingredients such as water. The present disclosure is further directed to a method of abating mosquitos in a treatment area comprising applying a mosquito repellent according to the inventive subject matter to the treatment area in an amount effective to kill about 80% of mosquitos in the treated area.

The present disclosure is directed to a method of using the above mosquito repellents to prevent mosquito reproduction by applying the mosquito repellent in an amount effective to disrupt a mosquito egg cycle and/or to kill mosquito larvae in the treated area In certain aspects the disclosure is directed to insect repellents comprising: about 0.05% to about 8% by weight lemongrass; about 0.05% to about 12% by weight castor oil; about 0.05% to about 7% by weight cedarwood oil; about 0.05% to about 6% by weight geraniol; about 0.01% to about 4% by weight sodium lauryl sulfate; about 0.05% to about 2% by weight corn oil; about 0.01% to about 10% by weight oleic acid; about 0.05% to about 20% by weight soaps; about 0.05% to about 8% by weight monolaurin; and about 50% to about 80% by weight water.

In certain embodiments, the insect repellent further comprises about 0.01% to about 8% by weight mint oil. In certain embodiments, the mint oil comprises Montana mint oil. In certain embodiments, the lemongrass comprises Guatemalan lemongrass. In certain embodiments, the cedarwood oil comprises *Juniperus virginiana* cedarwood oil.

In certain embodiments, the insect repellent further comprises about 0.01% to about 8% by weight wintergreen oil. In certain embodiments, the insect repellent of further comprises about 0.01% to about 5% by weight garlic oil. In certain embodiments, the insect repellent further comprises about 0.01% to about 8% by weight spearmint oil. In certain embodiments, the insect repellent comprises about 0.05% to about 10% by weight castor oil.

In other aspects, the disclosure relates to methods of killing insects in a treatment area comprising: applying an insect repellent as described herein to the treatment area in an amount effective to kill insects in the treatment area. In certain embodiments, the insect repellant is applied in an amount effective to kill at least 80% of insects in the treatment area one hour after applying the insect repellent to the treatment area. In certain embodiments, the insect repellant is applied in an amount effective to kill at least 20% of insects 3 weeks after applying the insect repellent to the treatment area.

In certain aspects, the disclosure relates to methods of preventing insect reproduction in a treatment area comprising: applying an insect repellent as described herein to the treatment area in an amount effective to at least one of (a) disrupt an insect egg cycle and (b) kill an insect larva in the treated area. In certain embodiments, the treatment area comprises a residential landscape, a commercial landscape, or an area that comprises a water feature, a lake or a stream. In certain embodiments, the insect repellent is applied directly to the insect.

In further aspects, the disclosure relates to methods of repelling insects from a surface, comprising applying an insect repellent as described herein to a surface in an amount effective to repel insects from the surface. In certain embodiments, the insect repellent is applied in an amount effective to repel at least 85% of insects from the surface one hour after applying the insect repellent to the surface. In certain embodiments, the insect repellent is applied in an amount effective to repel at least 20% of insects from the surface three weeks after applying the insect repellent to the surface. In certain embodiments, the surface is selected from the group consisting of a soil surface, a plant surface, and an exterior building surface.

In certain embodiments, the method further comprises diluting about 0.5 ounces, about 1 ounce, about 1.5 ounces, about 2 ounces, about 2.5 ounces, about 3 ounces, about 3.5 ounces, about 4 ounces, about 4.5 ounces, about 5 ounces, about 5.5 ounces, about 6 ounces, about 6.5 ounces, about 7 ounces, about 7.5 ounces, about 8 ounces, about 8.5 ounces, about 9 ounces, about 9.5 ounces, about 10 ounces, about 10.5 ounces, about 11 ounces, about 11.5 ounces, about 12 ounces, about 12.5 ounces, about 13 ounces, about 13.5 ounces, about 14 ounces, about 14.5 ounces, about 15 ounces, about 15.5 ounces, about 16 ounces, about 16.5 ounces, about 17 ounces, about 17.5 ounces, about 18 ounces, about 18.5 ounces, about 19 ounces, about 19.5, or about 20 ounces of an insect repellent concentrate with water to make a gallon of the insect repellent.

In certain embodiments, applying the insect repellent comprises spraying.

In certain embodiments, the insect is a mosquito or a tick. In certain embodiments, the tick is *Ixodes scapularis* or *Dermacentor variabilis*. In certain embodiments, the mosquito is *Aedes aegypti*.

DETAILED DESCRIPTION

The inventors discovered that the combination of essential oils and other ingredients disclosed herein synergistically repels insects. A preferred insect repellent includes Guatemalan lemongrass oil, Castor Oil, *Juniperus virginiana* cedarwood oil, geraniol, sodium lauryl sulfate, corn oil, oleic acid, soaps, monolaurin, water, and optionally, Montana mint oil. Advantageously, such preferred insect repellents exhibited more efficient repellency for a longer duration than Essentria® IC-3 Insecticide Concentrate, NatureShield® Insect & Pest Repellant, Mosquito Free/Cedarcide, and Bifen I/T.

As used herein, the term "insect repellent" means a composition that has repellent and/or insecticide properties as defined below. Insect repellents may exhibit repellent and insecticide effects against insects including, but not limited to mosquitos, ants, fleas, ticks, termites, dust mites, bed bugs, cockroaches, flies, no-see-ums, spiders, wasps, centipedes, gnats, silverfish and/or other insects.

As used herein, the term "repellent" means a substance that deters insects or other pests from approaching or settling. Insect repellents according to the inventive subject matter can provide at least, or more than, about 15%, 16%, 17%, 18%, 9%, 20%, 21%, 22%, 23%, 24%, 25%, 26%, 27%, 28%, 29%, 30%, 31%, 32%, 33%, 34%, 35%, 36%, 37%, 38%, 38%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% repellency. These values can also be used to form ranges, such as, for example, from about 15% to about 85% repellency, with preferred ranges for mosquitos ranging from about 20-50%; 25-40%; 40-55%; and 55-85%. The percent repellency is based on the percentage of the proportion of insects (e.g., mosquitos and ticks) that avoid treated surfaces or areas in favor of untreated surfaces or areas. For example, 100% repellency indicates that all insects avoided the treated area, and 50% repellency indicates that half of the insects avoided the treated area and half of the insects were not deterred from approaching or settling in the treated area.

As used herein, the term "insecticide" means a substance used to kill insects. Insect repellents according to the inventive subject matter can provide at least or more than about 15%, 16%, 17%, 18%, 9%, 20%, 21%, 22%, 23%, 24%, 25%, 26%, 27%, 28%, 29%, 30%, 31%, 32%, 33%, 34%, 35%, 36%, 37%, 38%, 38%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% insecticidal efficiency. These values can also be used to form ranges, such as, for example, from about 15% to about 85% insecticidal efficiency, with preferred ranges for mosquitos ranging from about 20-50%; 25-40%; 40-55%; and 55-85%. The percent insecticidal efficiency is based on the percentage of the proportion of insects (e.g., mosquitos and ticks) that die as measured immediately after treatment to 96 hours after treatment. For example, 100% insecticidal efficiency indicates that all insects counted between 48 to 72 hours after treatment were dead, and 50% insecticidal efficiency indicates that half of the insects were dead and half were alive when counted 48 to 72 hours after treatment.

In one embodiment, the inventive insect repellent comprises compositions that act as both a repellent and an insecticide, see Examples.

In one embodiment, the insect repellent of the present disclosure may kill both adult and larval insects and disrupt the insect egg cycle. In one embodiment, the inventive insect repellent inactivates or kills the insect eggs, e.g., mosquito and tick eggs. Without wishing to be bound by theory, the inventors hypothesize that the soaps and oils kill insect eggs by disrupting mass transfer through the endochorion and exochorion, such as desiccating insect eggs.

In one embodiment, insect repellents of the present disclosure comprise about 0.05% to about 8% by weight lemongrass oil, about 0.05% to about 10% by weight castor oil, about 0.05% to about 7% by weight cedarwood oil, about 0.05% to about 6% by weight geraniol, about 0.01% to about 4% by weight sodium lauryl sulfate, about 0.01% to about 8% by weight mint oil, and about 0.05% to about 2% by weight corn oil.

In one embodiment, insect repellents of the present disclosure comprise about 0.05% to about 8% by weight lemongrass oil, about 0.05% to about 10% by weight castor oil, about 0.05% to about 7% by weight cedarwood oil, about 0.05% to about 6% by weight geraniol, about 0.01% to about 4% by weight sodium lauryl sulfate, about 0.0% to about 8% by weight mint oil, and about 0.05% to about 2% by weight corn oil.

In one embodiment, insect repellents of the present disclosure comprise about 0.05% to about 8% by weight lemongrass oil, about 0.05% to about 10% by weight castor oil, about 0.05% to about 7% by weight cedarwood oil, about 0.05% to about 6% by weight geraniol, about 0.01% to about 4% by weight sodium lauryl sulfate, and about 0.05% to about 2% by weight corn oil.

Lemongrasses are cultivated commercially in Guatemala, India, the People's Republic of China, Paraguay, England, Sri Lanka, and other parts of Indochina, Africa, Central America, and South America. In a preferred embodiment, the insect repellent of the present disclosure comprises Guatemalan lemongrass oil. A major component of lemongrass oil is citral, which is also found in citronella oil. Other major constituents of lemongrass oil include geraniol, myrcene, citronellal, and limonene. The content and proportions of lemongrass oil's chemical constituents differs between species, East Indian, *Cymbopogon flexuosus* (DC.) Stapf., and West Indian, *Cymbopogon citratus* (DC. ex Nees) Stapf, and cultivation conditions. For example the chemical composition of lemongrass oil prepared from *C. Citratus* typically comprises:

| | |
|---|---|
| Monoterpenes | myrcene (10.2-18%), limonene (0.4%) |
| Aldehydes | geranial (45.2%), neral (32.4%), citronellal (0.2%) |
| Alcohols | α-terpineol (0.9%), citronellol (0.3%), geraniol |
| Esters | (5.5-40%) geranyl acetate (1.2%) |
| Minor Components | camphene, camphor, α-camphorene, Δ-3-carene, caryophyllene, caryophyllene oxide, 1,8-cineole, citronellal, citronellol, n-decyldehyde, α,β-dihydropseudoionone, dipentene, β-elemene, elemol, farnesal, farnesol, fenchone, furfural, iso-pulegol, iso-valeraldehyde, limonene, linalyl acetate, menthol, menthone, methyl heptenol, ocimene, α-oxobisabolene, β-phellandrene, α-pinene, β-pinene, terpineol, terpinolene, 2-undecanone, neral, nerolic acid, and geranic acid |

Essential Oil Bearing Plants:

*The genus Cymbopogon*. Edited by: Anand Akhila (2010). Lemongrass oil from *C. flexuosus* generally has a slightly lower citral and myrcene content. It should be appreciated that lemongrass oils can be enriched or fortified in desired components.

The insect repellent of the present disclosure may contain lemongrass oil at a level of about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6%, 6.05%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, 7%, 7.05%, 7.1%, 7.15%, 7.2%, 7.25%, 7.3%, 7.35%, 7.4%, 7.45%, 7.5%, 7.55%, 7.6%, 7.65%, 7.7%, 7.75%, 7.8%, 7.85%, 7.9%, 7.95%, or 8% by weight. These values of lemongrass oil can also be expressed as ranges, for example, between 0.05% and 8%, 0.5% and 7.5%, 1% and 7%, 1.5% and 6.5%, 2% and 6%, 2.5% and 5.5%, 3% and 5%, or 3.5% and 4.5%.

With respect to castor oil, contemplated insect repellents can contain about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6%, 6.05%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, 7%, 7.05%, 7.1%, 7.15%, 7.2%, 7.25%, 7.3%, 7.35%, 7.4%, 7.45%, 7.5%, 7.55%, 7.6%, 7.65%, 7.7%, 7.75%, 7.8%, 7.85%, 7.9%, 7.95%, 8%, 8.05%, 8.1%, 8.15%, 8.2%, 8.25%, 8.3%, 8.35%, 8.4%, 8.45%, 8.5%, 8.55%, 8.6%, 8.65%, 8.7%, 8.75%, 8.8%, 8.85%, 8.9%, 8.95%, 9%, 9.05%, 9.1%, 9.15%, 9.2%, 9.25%, 9.3%, 9.35%, 9.4%, 9.45%, 9.5%, 9.55%, 9.6%, 9.65%, 9.7%, 9.75%, 9.8%, 9.85%, 9.9%, 9.95%, or 10% by weight castor oil. These values of castor oil can also be expressed as ranges, for example, between 0.05% and 10%, 0.5% and 9.5%, 1% and 9%, 1.5% and 8.5%, 2% and 8%, 2.5% and 7.5%, 3% and 7%, 3.5% and 6.5%, 4% and 6%, or 4.5% and 5.5%.

Cedarwood oil is used in aromatherapy and topical applications. In a preferred insect repellents, the cedarwood oil comprises *Juniperus virginiana* cedarwood oil. Without wishing to be bound by a particular hypothesis, the exceptional repellency of the inventive insect repellents may be attributed at least in part to the characteristic concentrations of various components, such as cedrol, cedrene, and thujposene. In addition to killing insects, cedarwood oil is a pheromone interrupter, which prevents insects from colonizing susceptible trees and plants. Insect repellents of the present disclosure can contain cedarwood oil at proportions of about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6%, 6.05%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, or 7% by weight cedarwood oil. These values of cedarwood oil can also be expressed as ranges, for example, between 0.05% and 7%, 0.5% and 6.5%, 1% and 6%, 1.5% and 5.5%, 2% and 5%, 2.5% and 4.5%, or 3% and 4% by weight. Other cedarwood oils (e.g., *Mexicana*) can be supplemented with one or more active compounds to obtain the desired results.

Geraniol is used in perfumes and food flavorings and has been shown to repel insects. The insect repellent of the present disclosure can contain about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, and 6% by weight geraniol. These values of geraniol can also be expressed as ranges, for example, between 0.05% and 6%, 0.5% and 5.5%, 1% and 5%, 1.5% and 4.5%, 2% and 4%, or 2.5% and 3.5%.

Sodium lauryl sulfate is a detergent that emulsifies the essential oils with water to obtain a concentrate having the desired strength and with additional water used to dilute the concentrate to the desired application strength. The insect repellents of the present disclosure may contain about 0.01%, 0.015% 0.02%, 0.025% 0.03%, 0.035% 0.04%, 0.045%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, and 4% by weight sodium lauryl sulfate. These values of sodium lauryl sulfate can also be expressed as ranges, for example, between 0.01% and 4%, 0.02% and 3.5%, 0.03% and 3%, 0.04% and 2.5%, 0.05% and 2%, 0.1% and 1.5%, 0.15% and 1%, or 0.2% and 0.5%.

Mint oil has been used in food and cosmetic applications and has been used medicinally, especially to treat gastrointestinal disorders. Mint oils have also demonstrated insect repellent properties. There are several varieties of mint from which oil can be extracted to yield mint oils of different compositions. In one embodiment of the inventive insect repellents, the mint oil comprises Montana mint oil. The insect repellents of the present disclosure may contain about 0.0%, 0.01%, 0.015% 0.02%, 0.025% 0.03%, 0.035% 0.04%, 0.045%, 0.05%, 0.1%, 0.15%, 0.2%, 0.25%, 0.3%, 0.35%, 0.4%, 0.45%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6%, 6.05%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, 7%, 7.05%, 7.1%, 7.15%, 7.2%, 7.25%, 7.3%, 7.35%, 7.4%, 7.45%, 7.5%, 7.55%, 7.6%, 7.65%, 7.7%, 7.75%, 7.8%, 7.85%, 7.9%, 7.95%, or 8% by weight mint oil. These value of mint oil can also be expressed as ranges, for example, between 0.0% and 8%, 0.01% and 8%, 0.02% and 7.5%, 0.03% and 7%, 0.04% and 6.5%, 0.05% and 6%, 0.1% and 5.5%, 0.15% and 5%, 0.2% and 5%, 0.25% and 4.5%, 0.3% and 4%, 0.35% and 3.5%, 0.4% and 3%, 0.45% and 2.5%, 0.5% and 2%, 0.55% and 1.5%, or 0.6% and 1% by weight mint oil. In one embodiment, insect repellents of the present disclosure may comprise 0.01% to 8% by weight wintergreen oil and/or spearmint oil. Wintergreen oil and/or spearmint oil can be used in place of Montana mint oil or in combination therewith.

In certain embodiments, the inventive insect repellents can contain a carrier oil, in an amount of about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, and 6% by weight corn oil. These values can also be expressed as ranges, for example, the concentration of corn oil can be between 0.05% and 6%, 0.5% and 5.5%, 1% and 5%, 1.5% and 4.5%, 2% and 4%, or 2.5% and 3.5%. Other suitable oils that could be used in lieu of or in combination with corn oil include coconut oil, cocoa butter, palm kernel oil, palm oil, cottonseed oil, wheat germ oil, soybean oil, olive oil, sunflower oil, safflower oil, hemp oil, and/or canola oil. In one embodiment, inventive insect repellents may comprise mineral oil.

In another embodiment, insect repellents of the present disclosure may further comprise 0.01% to 5% by weight garlic oil. The insect repellents of the present disclosure may contain about 0.01%, 0.015% 0.02%, 0.025% 0.03%, 0.035% 0.04%, 0.045%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, or 5% by weight garlic oil. These values can also be expressed as ranges, for example, between 0.01% and 5%, 0.02% and 4.5%, 0.03% and 4%, 0.04% and 3.5%, 0.05% and 3%, 0.1% and 2.5%, 0.15% and 2%, 0.2% and 1.5%, 0.25% and 1%, or 0.3% and 0.5% by weight garlic oil.

In another embodiment, the insect repellent further comprises 0.01% to 10% by weight fatty acids, and in particular, oleic acid. The insect repellents of the present disclosure may contain about 0.01%, 0.015% 0.02%, 0.025% 0.03%, 0.035% 0.04%, 0.045%, 0.05%, 0.1%, 0.15%, 0.2%, 0.25%, 0.3%, 0.35%, 0.4%, 0.45%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6%, 6.05%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, 7%, 7.05%, 7.1%, 7.15%, 7.2%, 7.25%, 7.3%, 7.35%, 7.4%, 7.45%, 7.5%, 7.55%, 7.6%, 7.65%, 7.7%, 7.75%, 7.8%, 7.85%, 7.9%, 7.95%, 8%, 8.05%, 8.1%, 8.15%, 8.2%, 8.25%, 8.3%, 8.35%, 8.4%, 8.45%, 8.5%, 8.55%, 8.6%, 8.65%, 8.7%, 8.75%, 8.8%, 8.85%, 8.9%, 8.95%, 9%, 9.05%, 9.1%, 9.15%, 9.2%, 9.25%, 9.3%, 9.35%, 9.4%, 9.45%, 9.5%, 9.55%, 9.6%, 9.65%, 9.7%, 9.75%, 9.8%, 9.85%, 9.9%, 9.95%, or 10% by weight fatty acid. These value of oleic acid can also be expressed as ranges, for example, between 0.01% and 10%, 0.02% and 9.5%, 0.03% and 9%, 0.04% and 8.5%, 0.05% and 8%, 0.1% and 7.5%, 0.15% and 7%, 0.2% and 6.5%, 0.25% and 6%, 0.3% and 5.5%, 0.35% and 5%, 0.4% and 4.5%, 0.45% and 4%, 0.5% and 3.5%, 0.55% and 3%, 0.6% and 2.5%, 0.65% and 2%, 0.7% and 1.5%, or 0.75% and 1% by weight oleic acid. Oleic acid may act as an emulsifying agent.

In certain embodiments, the inventive insect repellents may contain other fatty acids in addition to or in lieu of oleic acid. Suitable fatty acids include, for example, short chain (fewer than 6 carbons), medium chain (1-12 carbons), long chain (13-21 carbons), and very long chain (22 or more carbons) saturated and unsaturated fatty acids. Exemplary saturated fatty acids include: caprylic acid, capric acid, lauric acid, myristic acid, palmitic acid, stearic acid, arachidic acid, behenic acid, lignoceric acid and cerotic acid.

Exemplary unsaturated fatty acids include: myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid, among others.

In certain embodiments, the insect repellent can contain 0.05% to 15% by weight soaps, such as castile, potassium laurate, potassium oleate, or other potassium salts of fatty acids. Insect repellents of the present disclosure can contain about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6%, 6.05%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, 7%, 7.05%, 7.1%, 7.15%, 7.2%, 7.25%, 7.3%, 7.35%, 7.4%, 7.45%, 7.5%, 7.55%, 7.6%, 7.65%, 7.7%, 7.75%, 7.8%, 7.85%, 7.9%, 7.95%, 8%, 8.05%, 8.1%, 8.15%, 8.2%, 8.25%, 8.3%, 8.35%, 8.4%, 8.45%, 8.5%, 8.55%, 8.6%, 8.65%, 8.7%, 8.75%, 8.8%, 8.85%, 8.9%, 8.95%, 9%, 9.05%, 9.1%, 9.15%, 9.2%, 9.25%, 9.3%, 9.35%, 9.4%, 9.45%, 9.5%, 9.55%, 9.6%, 9.65%, 9.7%, 9.75%, 9.8%, 9.85%, 9.9%, 9.95%, 10%, 10.05%, 10.1%, 10.15%, 10.2%, 10.25%, 10.3%, 10.35%, 10.4%, 10.45%, 10.5%, 10.55%, 10.6%, 10.65%, 10.7%, 10.75%, 10.8%, 10.85%, 10.9%, 10.95%, 11%, 11.05%, 11.1%, 11.15%, 11.2%, 11.25%, 11.3%, 11.35%, 11.4%, 11.45%, 11.5%, 11.55%, 11.6%, 11.65%, 11.7%, 11.75%, 11.8%, 11.85%, 11.9%, 11.95%, 2%, 12.05%, 12.1%, 12.15%, 12.2%, 12.25%, 12.3%, 12.35%, 12.4%, 12.45%, 12.5%, 12.55%, 12.6%, 12.65%, 12.7%, 12.75%, 12.8%, 12.85%, 12.9%, 12.95%, 3%, 13.05%, 13.1%, 13.15%, 13.2%, 13.25%, 13.3%, 13.35%, 13.4%, 13.45%, 13.5%, 13.55%, 13.6%, 13.65%, 13.7%, 13.75%, 13.8%, 13.85%, 13.9%, 13.95%, 4%, 14.05%, 14.1%, 14.15%, 14.2%, 14.25%, 14.3%, 14.35%, 14.4%, 14.45%, 14.5%, 14.55%, 14.6%, 14.65%, 14.7%, 14.75%, 14.8%, 14.85%, 14.9%, 14.95%, or 15% by weight soaps. These values of soaps can also be expressed as ranges, for example, between 0.05% and 15%, 0.5% and 14.5%, 1% and 14%, 1.5% and 13.5%, 2% and 13%, 2.5% and 12.5%, 3% and 12%, 3.5% and 11.5%, 4% and 11%, 4.5% and 10.5%, 5% and 10%, 5.5% and 9.5%, 6% and 9%, 6.5% and 8.5%, 6% and 8%, or 6.5% and 7.5%. Advantageously, soap aids in emulsifying the essential oils and water.

In certain embodiments, the insect repellent further comprises 0.05% to 8% by weight monolaurin. The insect repellent of the present disclosure may contain about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75%, 2.8%, 2.85%, 2.9%, 2.95%, 3%, 3.05%, 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95%, 4%, 4.05%, 4.1%, 4.15%, 4.2%, 4.25%, 4.3%, 4.35%, 4.4%, 4.45%, 4.5%, 4.55%, 4.6%, 4.65%, 4.7%, 4.75%, 4.8%, 4.85%, 4.9%, 4.95%, 5%, 5.05%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6%, 6.05%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, 7%, 7.05%, 7.1%, 7.15%, 7.2%, 7.25%, 7.3%, 7.35%, 7.4%, 7.45%, 7.5%, 7.55%, 7.6%, 7.65%, 7.7%, 7.75%, 7.8%, 7.85%, 7.9%, 7.95%, or 8% monolaurin by weight. These values of can also be expressed as ranges, for example, between 0.05% and 8%, 0.5% and 7.5%, 1% and 7%, 1.5% and 6.5%, 2% and 6%, 2.5% and 5.5%, 3% and 5%, or 3.5% and 4.5%. Monoglycerides of other fatty acids such as the short, medium, long, and very long chain saturated and unsaturated fatty acids listed above.

In certain embodiments, water can be used to dilute the insect repellent of the present disclosure to a desired concentration. For example, the insect repellent may contain about 70%, 70.05%, 70.1%, 70.15%, 70.2%, 70.25%, 70.3%, 70.35%, 70.4%, 70.45%, 70.5%, 70.55%, 70.6%, 70.65%, 70.7%, 70.75%, 70.8%, 70.85%, 70.9%, 70.95%, 71%, 71.05%, 71.1%, 71.15%, 71.2%, 71.25%, 71.3%, 71.35%, 71.4%, 71.45%, 71.5%, 71.55%, 71.6%, 71.65%, 71.7%, 71.75%, 71.8%, 71.85%, 71.9%, 71.95%, 72%, 72.05%, 72.1%, 72.15%, 72.2%, 72.25%, 72.3%, 72.35%, 72.4%, 72.45%, 72.5%, 72.55%, 72.6%, 72.65%, 72.7%, 72.75%, 72.8%, 72.85%, 72.9%, 72.95%, 73%, 73.05%, 73.1%, 73.15%, 73.2%, 73.25%, 73.3%, 73.35%, 73.4%, 73.45%, 73.5%, 73.55%, 73.6%, 73.65%, 73.7%, 73.75%, 73.8%, 73.85%, 73.9%, 73.95%, 74%, 74.05%, 74.1%, 74.15%, 74.2%, 74.25%, 74.3%, 74.35%, 74.4%, 74.45%, 74.5%, 74.55%, 74.6%, 74.65%, 74.7%, 74.75%, 74.8%, 74.85%, 74.9%, 74.95%, 75%, 75.05%, 75.1%, 75.15%, 75.2%, 75.25%, 75.3%, 75.35%, 75.4%, 75.45%, 75.5%, 75.55%, 75.6%, 75.65%, 75.7%, 75.75%, 75.8%, 75.85%, 75.9%, 75.95%, 76%, 76.05%, 76.1%, 76.15%, 76.2%, 76.25%, 76.3%, 76.35%, 76.4%, 76.45%, 76.5%, 76.55%, 76.6%, 76.65%, 76.7%, 76.75%, 76.8%, 76.85%, 76.9%, 76.95%, 77%, 77.05%, 77.1%, 77.15%, 77.2%, 77.25%, 77.3%, 77.35%, 77.4%, 77.45%, 77.5%, 77.55%, 77.6%, 77.65%, 77.7%, 77.75%, 77.8%, 77.85%, 77.9%, 77.95%, 78%, 78.05%, 78.1%, 78.15%, 78.2%, 78.25%, 78.3%, 78.35%, 78.4%, 78.45%, 78.5%, 78.55%, 78.6%, 78.65%, 78.7%, 78.75%, 78.8%, 78.85%, 78.9%, 78.95%, 79%, 79.05%, 79.1%, 79.15%, 79.2%, 79.25%, 79.3%, 79.35%, 79.4%, 79.45%, 79.5%, 79.55%, 79.6%, 79.65%, 79.7%, 79.75%, 79.8%, 79.85%, 79.9%, 79.95%, or 80% by weight water. These values can also be expressed as ranges, for example, between 70% and 80%, 71% and 79%, 72% and 78%, 73% and 77%, 74% and 76%, 70% and 75%, 75% and 80%, or 71% and 75%. Insect repellents containing about 70% to 80% about by water can be concentrates, which are further diluted before or during application.

In certain embodiments, insect repellents already containing water can be further diluted with additional water before or during application. The dilution rate of the insect repellent can be selected based on a number of factors including the degree of infestation, type and maturity of the plant material, the composition of the soil, the material of any structures, and the climate. For example, insect repellents containing about 70% to about 80% water by weight can be diluted by adding about 0.5 ounces, about 1 ounce, about 1.5 ounces, about 2 ounces, about 2.5 ounces, about 3 ounces, about 3.5 ounces, about 4 ounces, about 4.5 ounces, about 5 ounces, about 5.5 ounces, about 6 ounces, about 6.5 ounces, about 7 ounces, about 7.5 ounces, about 8 ounces, about 8.5 ounces, about 9 ounces, about 9.5 ounces, about 10 ounces, about 10.5 ounces, about 11 ounces, about 11.5 ounces, about 12 ounces, about 12.5 ounces, about 13 ounces, about 13.5 ounces, about 14 ounces, about 14.5 ounces, about 15 ounces, about 15.5 ounces, about 16 ounces, about 16.5 ounces, about 17 ounces, about 17.5 ounces, about 18 ounces, about 18.5 ounces, about 19 ounces, about 19.5, or about 20 ounces of insect repellent to a gallon of water prior to application.

It should be appreciated that yet further inactive ingredients can be included in the insect repellents of the present disclosure while maintaining the unexpected efficacy and longevity of the inventive insect repellents. For example, solvents other than water, such as ethyl lactate, alcohols (e.g., ethanol, isopropanol, butanol, octanol etc.), and DMSO. Other ingredients that could be included in the inventive insect repellents include emulsifiers (e.g., polyglyceryl oleate), stabilizers, preservatives (e.g., potassium sorbate), and thickening agents (e.g., xanthan gum).

The insect repellent of the present disclosure can be used to repel insects, e.g., mosquitos, ticks, and/or other insects from a treatment area. Treatment areas include, but are not limited to, soil, plants (e.g., crops), buildings, decks, gazebos, homes (e.g., houses, apartments, etc.), tents, motorhomes, furniture, including indoor and/or outdoor structures, clothing, and/or insect nets, for example. The inventive insect repellents may also be formulated as a spray, lotion, cream, or gel for topical administration to humans, pets, live stock, or other animals. The mode of application may be adapted to the treatment area. For example spray application may be used for plants, soil, and building exteriors. In one embodiment, the inventive insect repellents can be painted onto treatment areas (e.g., tree trunks, decks, and gazebos). To repel insects from one or more people, a diffuser can be used to volatilize the inventive insect repellents.

In one embodiment, the insect repellent composition of the present disclosure may be used to kill insects, e.g., mosquitos, ticks, and/or other insects from a treatment area. Thus, in one embodiment, the invention is directed to a method of killing insects, e.g., mosquitos, ticks, and/or other insects in a treatment area comprising applying the insect repellent of the present disclosure to a treatment area in an amount effective to kill 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% of insects in the treated area. These values can also be expressed as ranges, for example, the inventive insect repellents kill 40% to 100%, 45% to 95%, 55% to 90%, or 60% to 85% of insects in a treatment area when applied to said treatment area.

In another embodiment, the invention is directed to a method of repelling insects in a treatment area comprising applying the insect repellent of the present disclosure to a treatment area in an amount effective to repel 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% of insects in the treated area. These values can also be expressed as ranges, for example, the inventive insect repellents repel 60% to 100%, 65% to 95%, 75% to 90%, or 70% to 85% of insects in a treatment area when applied to said treatment area.

In certain embodiments, the insect repellent of the present invention can be used to disrupt the insect egg cycle. For example, pheromone interruption can occur when female insects encounter oils that affect the females' ability to mate. Soaps and castor oil may cause mortality to eggs, either previously laid, or being carried within the female insect.

In certain embodiments, the inventive insect repellent can kill, repel, and disrupt the egg cycle. Soap activates when absorbed into the body of the insect (e.g., mosquitos, ticks, and/or other insects) via its breathing apparatuses, including spiracles and siphons. The absorbed soap causes insect death as the soap expands within the insect's body. Oils repel via pheromone interruption, as described above.

The quantity of insect repellent to be applied depends on a number of factors, such as whether the application area is indoors or outdoors. In one embodiment, ⅛ gallon, ¼ gallon, ⅜ gallon, ½ gallon, ⅝ gallon, ¾ gallon, ⅞ gallon, 1 gallon, or 1¼ gallons of diluted insect repellent is applied per 1000 square feet. These values can also be expressed as ranges, for example, ⅛ gallon to 1¼ gallons, ⅜ gallon to 1 gallon, ½ gallon to ⅞ gallon, or ⅝ gallon to ¾ gallon of diluted insect repellent applied per 1000 square feet. Repellent can be applied using high pressure blowers, backpack blowers, pump up backpack sprayers, and other sprayers. Sprayers can be handheld (e.g., STIHL®), an automated irrigation system, or even spray bottles. When handheld sprayers and irrigation systems are used, the insect repellent may be diluted during application. When spray bottles are used, the insect repellent is diluted prior to application. In one embodiment of the inventive insect repellents (concentrated or diluted) are dispersed using aerosol cans/sprayers, vaporizers, or bombs. In one embodiment, treatment areas include at least a portion of an object that is dipped into insect repellents of the present disclosure, either concentrated or diluted. For example a potted plant or insect netting can be dipped into the inventive insect repellent.

The duration of the inventive insect repellent's effectiveness after application, and thus, the frequency of application depends on factors, such as the degree of infestation, the area to be treated, and the climate. For example, insect repellents of the present disclosure may repel and/or kill insects, e.g., mosquitos and/or ticks, for at least 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22, hours, 23 hours, 24 hours, 25 hours, 26 hours, 27 hours, 28 hours, 29 hours, 30 hours, 31 hours, 32 hours, 33 hours, 34 hours, 35 hours, 36 hours 37 hours, 38 hours, 39 hours, 40 hours, 41 hours, 42 hours, 43 hours, 44 hours, 45 hours, 46 hours 47 hours, 48 hours, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, or 30 days per application. These values can also be expressed as ranges, for example, insect repellents of the present disclosure may repel and/or kill insects, e.g., mosquitos and/or ticks, for at least 1 hour to 7 days, 7 days to 10 days, 10 days to 14 days, 14 days to 17 days, 17 days to 20 days, 20 days to 23 days, 23 days to 26 days, or 26 days to 30 days, inclusive.

In certain embodiments, once applied, the inventive insect repellents retain the ability to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for a certain period of time after application as outlined above. For example, in one embodiment, the inventive insect repellents retain the ability to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least four weeks after application. In another embodiment, the inventive insect repellents retain the ability to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least three weeks after application. In one embodiment, the inventive insect repellents retain the ability to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least two weeks. In yet another embodiment, the inventive insect repellents retain the ability to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least one week after application. These values can also be expressed as ranges, for example, insect repellents of the present disclosure may repel 100%-85% of mosquitos insects, e.g., mosquitos and/or ticks, for one week, 90%-80% of insects, e.g., mosquitos and/or ticks, for two weeks, 85%-75% of insects, e.g., mosquitos and/or ticks, for three weeks, and 75%-50% for four weeks.

In one embodiment, the inventive insect repellents retain the ability to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least four weeks, or more. In one embodiment, the inventive insect repellents retain the ability to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least three weeks. In one embodiment, the inventive insect repellents retain the ability to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least two weeks. In one embodiment, the inventive insect repellents retain the ability to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects, e.g., mosquitos and/or ticks, for at least one week. These values can also be expressed as ranges, for example, insect repellents of the present disclosure may kill 100%-75% of insects, e.g., mosquitos and/or ticks, for one week, 100%-75% of insects, e.g., mosquitos and/or ticks, for two weeks, 90%-60% of insects, e.g., mosquitos and/or ticks, for three weeks, and 60%-35% for four weeks.

In certain aspects, the disclosure relates to a method of killing insects (e.g. mosquitos and/or ticks) in a treatment area comprising applying an insect repellent as disclosed herein to the treatment area in an amount effective to kill insects in the treatment area.

In some embodiments, the insect repellant is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area 30 minutes after applying the insect repellent to the treatment area.

In some embodiments, the insect repellant is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area one hour after applying the insect repellent to the treatment area.

In some embodiments, the insect repellant is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area two hours after applying the insect repellent to the treatment area.

In some embodiments, the insect repellant is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area four hours after applying the insect repellent to the treatment area.

In some embodiments, the insect repellant is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area 24 hours after applying the insect repellent to the treatment area.

In some embodiments, the insect repellant is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area one week after applying the insect repellent to the treatment area.

In some embodiments, the insect repellant is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area two weeks after applying the insect repellent to the treatment area.

In some embodiments, the insect repellent is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area three weeks after applying the insect repellent to the treatment area.

In some embodiments, the insect repellent is applied in an amount effective to kill at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) in the treatment area four weeks after applying the insect repellent to the treatment area.

In certain aspects, the disclosure relates to a method of repelling insects from a surface, comprising applying an insect repellent as disclosed herein to a surface in an amount effective to repel insects from the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface 30 minutes after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface one hour after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface two hours after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface four hours after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface 24 hours after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface one week after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface two weeks after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface three weeks after applying the insect repellent to the surface.

In some embodiments, the insect repellent is applied in an amount effective to repel at least 5%, 10%, 15%, 20%, 25%, 30%, 40%, 45%, 50%, 55%, 60%, 65%, 70%, 75%, 80%, 85%, 90%, 95%, 96%, 97%, 98%, 99% or 100% of insects (e.g. mosquitos and/or ticks) from the surface four weeks after applying the insect repellent to the surface.

For indoor treatment areas (e.g., greenhouses and/or houseplants), insect repellent may be applied once per month, or more frequently (e.g., once every three weeks, once every two weeks, weekly, every other day, or every day). To treat areas where the insect repellent is likely to be washed away by rain or frequent watering, more frequent applications may be necessary. In certain embodiments, it is preferred that the insect repellent of the disclosure is applied in a manner to treat outbreaks, or new infestations, as close as possible to the beginning stages of the outbreak rather than after the infestation has already set in place.

The inventive subject matter further provides a method of preventing insect reproduction in a treatment area comprising applying a insect repellent as described herein to the treatment area in an amount effective to at least one of (a) disrupt a insect egg cycle and (b) kill a insect larva in the treated area for a duration of at least 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22, hours, 23 hours, 24 hours, 25 hours, 26 hours, 27 hours, 28 hours, 29 hours, 30 hours, 31 hours, 32 hours, 33 hours, 34 hours, 35 hours, 36 hours 37 hours, 38 hours, 39 hours, 40 hours, 41 hours, 42 hours, 43 hours, 44 hours, 45 hours, 46 hours 47 hours, 48 hours, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, or 30 days weeks after application. These values can also be expressed as ranges, for example, insect repellents of the present disclosure may repel and/or kill insects, e.g. mosquitos, ticks, and/or other insects for at least 1 hour to 7 days, 7 days to 10 days, 10 days to 14 days, 14 days to 17 days, 17 days to 20 days, 20 days to 23 days, 23 days to 26 days, or 26 days to 30 days, inclusive. Effective amounts are described above. For example, four to six ounces of the inventive insect repellent diluted in one gallon of water can be applied to 1000 square feet to at least one of (a) disrupt a insect egg cycle and (b) kill a insect larva in the treated area for a duration of four weeks after application.

While this disclosure has been particularly shown and described with reference to example embodiments thereof, it will be understood by those skilled in the art that various changes in form and details may be made therein without departing from the scope of the invention encompassed by the appended claims.

EXAMPLES

Example 1—Insect Repellent 1

Insect Repellent 1 is prepared by mixing lemongrass oil, castor oil, cedarwood oil, geraniol, sodium lauryl sulfate, mint oil, corn oil, oleic acid, soaps, and monolaurin according to the proportions provided in Table 1. The resulting oil mixture is then slowly added to balance water with mixing to dissolve the oils and detergents, forming an emulsion. The resulting concentrated insect repellent can then be further diluted prior to or during application, for example as described in Examples 7-9, below.

TABLE 1

Formula of Insect Repellent 1.

| | |
|---|---|
| Lemongrass Oil | 0.05% to 8% by weight |
| Castor Oil | 0.05% to 10% by weight |
| Cedarwood Oil | 0.05% to 7% by weight |
| Geraniol | 0.05% to 6% by weight |
| Sodium Lauryl Sulfate | 0.01% to 4% by weight |
| Mint Oil | 0.01% to 8% by weight |
| Corn Oil | 0.05% to 2% by weight |
| Oleic Acid | 0.01% to 10% by weight |
| Soaps | 0.05% to 15% by weight |
| Monolaurin | 0.05% to 8% by weight |
| Balance Water | 70% to 80% by weight |

Example 2—Insect Repellent 2

Insect Repellent 2 is prepared by mixing Guatemalan lemongrass oil, castor oil, *Juniperus virginiana* cedarwood oil, geraniol, sodium lauryl sulfate, Montana mint oil, corn oil, oleic acid, soaps, and monolaurin according to the proportions provided in Table 2. The resulting oil mixture is then slowly added to balance water with mixing to dissolve the oils and detergents, forming an emulsion. The resulting concentrated insect repellent can then be further diluted prior to or during application, for example as described in Examples 7-9, below.

TABLE 2

Formula of Insect Repellent 2.

| | |
|---|---|
| Guatemalan Lemongrass Oil | 2% to 6% by weight |
| Castor Oil | 2% to 6% by weight |
| *Juniperus virginiana* Cedarwood Oil | 2% to 6% by weight |
| Geraniol | 1% to 5% by weight |
| Sodium Lauryl Sulfate | 0.05% to 2% by weight |
| Montana Mint Oil | 0.05% to 4% by weight |
| Corn Oil | 0.05% to 2% by weight |
| Oleic Acid | 1% to 8% by weight |
| Soaps | 1% to 8% by weight |
| Monolaurin | 0.5% to 5% by weight |
| Balance Water | 70% to 80% by weight |

Example 3—Insect Repellent 3

Insect Repellent 3 is prepared by mixing lemongrass oil, castor oil, cedarwood oil, geraniol, sodium lauryl sulfate, mint oil, corn oil, oleic acid, soaps, and monolaurin according to the proportions provided in Table 3. The resulting oil mixture is then slowly added to balance water with mixing to dissolve the oils and detergents, forming an emulsion. The resulting concentrated insect repellent can then be further diluted prior to or during application, for example as described in Examples 7-9, below.

TABLE 3

Formula of Insect Repellent 3.

| | |
|---|---|
| Lemongrass Oil | 0.05% to 8% by weight |
| Castor Oil | 0.05% to 12% by weight |
| Cedarwood Oil | 0.05% to 7% by weight |
| Geraniol | 0.05% to 6% by weight |
| Sodium Lauryl Sulfate | 0.01% to 4% by weight |
| Mint Oil | 0.0% to 8% by weight |
| Corn Oil | 0.05% to 2% by weight |
| Oleic Acid | 0.01% to 10% by weight |
| Soaps | 0.05% to 20% by weight |
| Monolaurin | 0.05% to 8% by weight |
| Balance Water | 50% to 80% by weight |

Example 4—Insect Repellent 4

Insect Repellent 4 is prepared by mixing Guatemalan lemongrass oil, castor oil, *Juniperus virginiana* cedarwood oil, geraniol, sodium lauryl sulfate, Montana mint oil, corn oil, oleic acid, soaps, and monolaurin according to the proportions provided in Table 4. The resulting oil mixture is then slowly added to balance water with mixing to dissolve the oils and detergents, forming an emulsion. The resulting concentrated insect repellent can then be further diluted prior to or during application, for example as described in Examples 7-9, below.

TABLE 4

Formula of Insect Repellent 4.

| | |
|---|---|
| Guatemalan Lemongrass Oil | 2% to 6% by weight |
| Castor Oil | 2% to 10% by weight |
| *Juniperus virginiana* Cedarwood Oil | 2% to 6% by weight |
| Geraniol | 1% to 5% by weight |
| Sodium Lauryl Sulfate | 0.05% to 2% by weight |
| Montana Mint Oil | 0.0% to 4% by weight |
| Corn Oil | 0.05% to 2% by weight |
| Oleic Acid | 1% to 8% by weight |
| Soaps | 1% to 20% by weight |

TABLE 4-continued

Formula of Insect Repellent 4.

| | |
|---|---|
| Monolaurin | 0.5% to 5% by weight |
| Balance Water | 50% to 80% by weight |

Example 5—Insect Repellent 5

Insect Repellent 5 is prepared by mixing lemongrass oil, castor oil, cedarwood oil, geraniol, sodium lauryl sulfate, corn oil, oleic acid, soaps, and monolaurin according to the proportions provided in Table 5. The resulting oil mixture is then slowly added to balance water with mixing to dissolve the oils and detergents, forming an emulsion. The resulting concentrated insect repellent can then be further diluted prior to or during application, for example as described in Examples 7-9, below.

TABLE 5

Formula of Insect Repellent 5.

| | |
|---|---|
| Lemongrass Oil | 0.05% to 8% by weight |
| Castor Oil | 0.05% to 12% by weight |
| Cedarwood Oil | 0.05% to 7% by weight |
| Geraniol | 0.05% to 6% by weight |
| Sodium Lauryl Sulfate | 0.01% to 4% by weight |
| Corn Oil | 0.05% to 2% by weight |
| Oleic Acid | 0.01% to 10% by weight |
| Soaps | 0.05% to 20% by weight |
| Monolaurin | 0.05% to 8% by weight |
| Balance Water | 50% to 80% by weight |

Example 6—Insect Repellent 6

Insect Repellent 6 is prepared by mixing Guatemalan lemongrass oil, castor oil, *Juniperus virginiana* cedarwood oil, geraniol, sodium lauryl sulfate, corn oil, oleic acid, soaps, and monolaurin according to the proportions provided in Table 6. The resulting oil mixture is then slowly added to balance water with mixing to dissolve the oils and detergents, forming an emulsion. The resulting concentrated insect repellent can then be further diluted prior to or during application, for example as described in Examples 7-9, below.

TABLE 6

Formula of Insect Repellent 6.

| | |
|---|---|
| Guatemalan Lemongrass Oil | 2% to 6% by weight |
| Castor Oil | 2% to 10% by weight |
| *Juniperus virginiana* Cedarwood Oil | 2% to 6% by weight |
| Geraniol | 1% to 5% by weight |
| Sodium Lauryl Sulfate | 0.05% to 2% by weight |
| Corn Oil | 0.05% to 2% by weight |
| Oleic Acid | 1% to 8% by weight |
| Soaps | 1% to 20% by weight |
| Monolaurin | 0.5% to 5% by weight |
| Balance Water | 50% to 80% by weight |

Example 7—Mosquito Repellency and Insecticidal Efficiency

Preparation of Trial Area

Five greenhouses, one greenhouse for each product tested for repellency and insecticide efficiency, were prepared. In each of the five greenhouses, one 1,000 foot area was zoned off for the mosquito repellency test, and one 1,000 foot area was zoned off for the mosquito insecticide test. Each greenhouse contained three rows of landscape plant material spaced three feet apart from the center of each plant. Temperatures of greenhouse areas were maintained at 74-84 degrees Fahrenheit, and the humidity was maintained at 60-70%. When the temperature is under 50 degrees Fahrenheit, mosquitos may go dormant. In humidity below 60%, mosquitos may exhibit less activity. At temperatures above 84 degrees Fahrenheit and humidities above 70%, mosquitos may increase egg laying activity. All areas were enclosed with no wind fan activity during trials.

Sample Preparation

Essentria® IC-3 Insecticide Concentrate, NatureShield® Insect & Pest Repellant, Mosquito Free/Cedarcide ("GG Cedarcide"), Insect Repellent 2, and Bifen I/T ("bifenthrin") solutions were mixed with water to make one gallon of ready to spray product, per the instructions on each product's label. The active ingredients of Essentria® IC-3 Insecticide Concentrate are rosemary 10%, geraniol 5%, and peppermint oil 2%, and other ingredients included in the remaining 83% of the concentrate include wintergreen oil, white mineral oil, vanillin, and polyglyceryl oleate. The active ingredients of GG Cedarcide include cedarwood oil and refined soybean oil, and the inactive ingredients include mineral oil, isopropyl myristate, and diatomaceous earth. Bifen I/T includes 7.9% bifenthrin and 92.1% unspecified ingredients. The active ingredients of NatureShield® Insect & Pest Repellant are cedar oil 47.7%, and 2-phenethyl propionate 15.3%, and inert ingredients, e.g., soap bark and ethyl lactate, comprise 37% of the formulation.

Repellency Test Protocol

Each product, Essentria® IC-3 Insecticide Concentrate Insecticide Concentrate, NatureShield® Insect & Pest Repellant, GG Cedarcide (concentrate made from natural cedarwood oil), Insect Repellent 2, and bifenthrin, was applied to one zone of the greenhouse assigned to that product using a clean Stihl hand pump wand sprayer. One hour after application, 25 live *Aedes Aegypti* mosquitos were released into the treated area. The number of mosquitos that avoided treated vegetation and soil was recorded, then all mosquitos were removed. Mosquitoes were driven away from the plants and landed on wall, where they were counted. The effectiveness of the single application was tested each week for three additional weeks by introducing 25 live insects. The number of mosquitos that avoided the treated vegetation and soil were recorded, and all mosquitos were removed. bifenthrin was ineffective as a repellent. Essentria® IC-3 Insecticide Concentrate, NatureShield® Insect & Pest Repellant, and GG Cedarcide lost repellency after two weeks. Insect Repellent 2 retained repellency through the four week experimental period.

Results

TABLE 7A

Number and Percent of 25 Mosquitos Repelled.

| Week | Essentria® IC-3 | NatureShield® | GG Cedarcide | Insect Repellent 2 | Bifenthrin |
|---|---|---|---|---|---|
| 1 | 20 | 18 | 16 | 22 | 0 |
|   | 80% | 72% | 64% | 92% | 0% |
| 2 | 15 | 10 | 8 | 22 | 0 |
|   | 60% | 40% | 32% | 88% | 0% |
| 3 | 4 | 0 | 0 | 19 | 0 |
|   | 16% | 0% | 0% | 76% | 0% |
| 4 | 0 | 0 | 0 | 15 | 0 |
|   | 0% | 0% | 0% | 60% | 0% |

Insecticide Test Protocol

In the second zone of each greenhouse from Example 3, 25 live *Aedes Aegypti* mosquitos were released one hour before each product was applied using a clean Stihl hand pump wand sprayer (single application for four week period). Live and dead mosquitos were collected 48-72 hours after product application. Each week for three additional weeks, 25 live mosquitos were introduced into bifenthrin, a neurotoxin, killed 88% of mosquitos in week 1, and insecticidal efficiency decreased to 60% at week 4. the second zone, results were recorded, and the live/dead mosquitos were removed. Essentria® IC-3 Insecticide Concentrate, NatureShield® Insect & Pest Repellant, and GG Cedarcide were poor insecticides. Insect Repellent 2 killed between 40% and 80% of mosquitos during the four week trial.

TABLE 7B

Number and Percent of 25 Mosquitos Killed.

| Week | Essentria® IC-3 | Nature Shield | GG Cedarcide | Insect Repellent 2 | Bifenthrin |
|---|---|---|---|---|---|
| 1 | 8 | 0 | 4 | 19 | 22 |
|   | 32% | 0% | 16% | 76% | 88% |
| 2 | 2 | 0 | 0 | 20 | 20 |
|   | 8% | 0% | 0% | 80% | 80% |
| 3 | 0 | 0 | 0 | 17 | 19 |
|   | 0% | 0% | 0% | 68% | 76% |
| 4 | 0 | 0 | 0 | 10 | 15 |
|   | 0% | 0% | 0% | 40% | 60% |

Example 8—Mosquito Short- and Long-Term Insecticidal Efficiency

Insecticide Test Protocol

Experiments were performed in greenhouses maintained at 80 degrees Fahrenheit during the day and 70 degrees Fahrenheit during the night. Four plants were placed into each insect net (model LH175, 27 inches by 27 inches by 48 inches, Educational Science, League City Tex., USA). The layout for testing four insecticide was determined using a randomized complete block design with four replications.

The four insecticides were Insect Repellent 6, Bifen I/T (bifenthrin), Essentria® IC-3 Insecticide Concentrate, NatureShield® Insect & Pest Repellant. Insect Repellent 6 was diluted by adding water to 6 oz. of concentrate to a final volume of one gallon of diluted insecticide. Bifenthrin solutions were prepared by mixing 2 oz. of Bifen I/T with water to make one gallon of ready to spray product. Essentria® IC-3 Insecticide Concentrate was diluted by adding water to 8 oz. of concentrate to a final volume of one gallon of diluted insecticide. NatureShield® Insect & Pest Repellant was diluted by adding water to 8 oz. of concentrate to a final volume of one gallon of diluted insecticide.

The diluted insecticides were sprayed on the interior of each respective insect net and allowed to dry for one hour. About fifty *Aedes aegypti* mosquitos were released into each net, and the number of mosquitos that died right after the container used to transfer the mosquitos to the insect net was opened, the "initial mortality," was recorded. After one hour the number of living mosquitos was recorded. The mosquitos were monitored every 24 hours for three days. Each week the number of any living mosquitos from the previous week was recorded, and 50 additional mosquitos were released into the insect nets and populations counted after one hour and every 24 hours for three days.

During the fourth week, a control experiment was conducted in which an insect net was sprayed with water and allowed to dry for one hour. The remaining mosquitos that were not used in the insecticide treatment experiments were released into the control insect net. The number of mosquitos that died immediately upon release was estimated as was the population at 24 hours, 48 hours, and 96 hours after release.

Results

The experimental results are presented in Table 8. Mosquitos released into the nets treated with NatureShield® Insect & Pest Repellant died within 48 hours and maintained this 100% insecticidal efficiency at 48 hours for the duration of the four week test period. Mosquitos released into the nets treated with Essentria® IC-3 Insecticide Concentrate died within 48-96 hours and maintained 100% insecticidal efficiency at 96 hours for the duration of the four week test period. The nets sprayed with Essentria® IC-3 Insecticide Concentrate and NatureShield® Insect & Pest Repellant each contained more than 50 mosquitos after one hour. In contrast, both Insect Repellent 6 and bifenthrin killed 100% of the mosquitos after one hour and retained 100% insecticidal efficiency over a four-week period.

In the control group, fewer than 20 mosquitos died immediately upon release. The population remained greater than 50 for 48 hours. At 96 hours none of the control mosquitos had survived.

These results demonstrate that Insect Repellent 6 can be sprayed where plants are grown, such as landscapes near residences and commercial real estate without use of neurotoxins such as bifenthrin. Insect Repellent 6 is also expected to be safe an effective for repellent/insecticidal applications in areas that contain standing water, water features, lakes, or streams.

TABLE 8

Mosquito Insecticidal Efficiency.

| | NatureShield® Insect & Pest Repellant | | | | Bifen I/T | | | | Essentria® IC-3 Insecticide Concentrate | | | | Insect Repellent 6 | | | |
|---|---|---|---|---|---|---|---|---|---|---|---|---|---|---|---|---|
| Week | I | 24 h | 48 h | 96 h | I | 24 h | 48 h | 96 h | I | 24 h | 48 h | 96 h | I | 24 h | 48 h | 96 h |
| 1 | 8 | 1 | 0 | 0 | 17 | 0 | 0 | 0 | 14 | 7 | 0 | 0 | 10 | 0 | 0 | 0 |
| 2 | 20 | 2 | 0 | 0 | 15 | 0 | 0 | 0 | 9 | 44 | 16 | 0 | 11 | 0 | 0 | 0 |
| 3 | 25 | 0 | 0 | 0 | 52 | 0 | 0 | 0 | 29 | 0 | 0 | 0 | 23 | 0 | 0 | 0 |
| 4 | 34 | 1 | 0 | 0 | 28 | 0 | 0 | 0 | 16 | 2 | 0 | 0 | 31 | 0 | 0 | 0 |
| Control | <20 | >50 | >50 | 0 | | | | | | | | | | | | |

I = Initial mortality at release, the number of mosquitos that died after the container was opened inside the net.

Example 9—Tick Insecticidal Efficiency

Insecticide Test Protocol

Experiments were performed in greenhouses maintained at 80 degrees Fahrenheit during the day and 70 degrees Fahrenheit during the night. Four plants were placed into each insect net (model LH175, 27 inches by 27 inches by 48 inches, Educational Science, League City Tex., USA). Fifty deer ticks *Ixodes scapularis* and fifty American dog ticks *Dermacentor variabilis* (Oklahoma State University, Department of Entomology & PLP, Stillwater, Okla., USA) were released into each net and allowed to acclimatize for 2 hours. Insect Repellent 6 was diluted by adding water to 6 oz. of concentrate to a final volume of one gallon of diluted insecticide. The diluted insecticide was sprayed on the ticks, covering all areas of each insect net. The ticks were counted every 30 minutes for two hours and 24 hours after spraying.

Results

Insect Repellent 6 killed 75% of the ticks after one half hour. At one hour 100% of the ticks were dead. These results demonstrate the Insect Repellent 6 rapidly kills ticks without posing the health hazards associated with neurotoxins such as bifenthrin.

Example 10—Insecticidal Efficiency Direct Spray Applications—Yellow Fever Mosquitos Insecticide Test Protocol The objective of this study was to evaluate the efficacy of Insect Repellent 6 (6 ounces diluted with water to make 1 gallon) and Bifen I/T (0.33 ounces diluted with water to make 1 gallon) when sprayed directly on yellow fever mosquitoes *Aedes aegypti* (adult females) under ambient laboratory conditions. For each experiment, 10 insects were placed in 2.25" CPVC cartridge with tulle mesh. Next, Insect Repellent 6 was applied to the insects at a rate of 2.5 ft in 1 second spray from a 3-foot distance using Stihl 2.5 gallon gas powered sprayer set on setting 2 with a misting head (1 gal/3000 ft$^2$). Bifenthrin was applied to the insects at a rate of 33 inch length in 1 second spray from 12-inch distance using Snell Sci. compressed air sprayer at 20 pounds per square inch. The number of live, knockdown (KD), and dead insects was counted 30 minutes and 1 hour after insecticide application. One hour after treatment, the insects were transferred to 20 oz. SOLO cups with a 10% sucrose soaked cotton ball to provide food and moisture and covered with a mesh lid. The insects were monitored 2 hours, 4 hours, and 24 hours after insecticide application. The control groups were untreated. Each experiment was performed in 5 replicates.

Results

The results for the yellow fever mosquito experiments are presented in Tables 10A-C. After 24 hours only 4% of the control mosquitos had died. In contrast, 100% of the mosquitos sprayed with Insect Repellent 6 were dead within 2 hours. In four of the replicates, 100% mortality was observed within one half hour of insecticide application. The insecticidal efficiency of Insect Repellent 6 was faster than bifenthrin, which took 24 hours to kill 100% of the mosquitos. The Inventors expect Insect Repellent 6 to maintain this insecticidal efficiency for at least four weeks.

TABLE 10A

Direct Application Test Results - Yellow Fever Mosquitoes. Control - Untreated

| Rep | Cond. | Pre-trt | 30 min | 1 hr | 2 hr | 4 hr | 24 hr |
|---|---|---|---|---|---|---|---|
| A | Alive | 10 | 10 | 10 | 10 | 10 | 7 |
|   | KD | 0 | 0 | 0 | 0 | 0 | 2 |
|   | Dead | 0 | 0 | 0 | 0 | 0 | 1 |
| B | Alive | 10 | 10 | 10 | 10 | 10 | 9 |
|   | KD | 0 | 0 | 0 | 0 | 0 | 1 |
|   | Dead | 0 | 0 | 0 | 0 | 0 | 0 |
| C | Alive | 10 | 10 | 10 | 10 | 10 | 8 |
|   | KD | 0 | 0 | 0 | 0 | 0 | 1 |
|   | Dead | 0 | 0 | 0 | 0 | 0 | 1 |
| D | Alive | 10 | 10 | 10 | 10 | 10 | 9 |
|   | KD | 0 | 0 | 0 | 0 | 0 | 1 |
|   | Dead | 0 | 0 | 0 | 0 | 0 | 0 |
| E | Alive | 10 | 10 | 10 | 10 | 10 | 10 |
|   | KD | 0 | 0 | 0 | 0 | 0 | 0 |
|   | Dead | 0 | 0 | 0 | 0 | 0 | 0 |
|   | Avg. Dead | 0 | 0 | 0 | 0 | 0 | 0 |
| A | Alive | 100% | 100% | 100% | 100% | 100% | 70% |
|   | KD | 0% | 0% | 0% | 0% | 0% | 20% |
|   | Dead | 0% | 0% | 0% | 0% | 0% | 10% |
| B | Alive | 100% | 100% | 100% | 100% | 100% | 90% |
|   | KD | 0% | 0% | 0% | 0% | 0% | 10% |
|   | Dead | 0% | 0% | 0% | 0% | 0% | 0% |
| C | Alive | 100% | 100% | 100% | 100% | 100% | 80% |
|   | KD | 0% | 0% | 0% | 0% | 0% | 10% |
|   | Dead | 0% | 0% | 0% | 0% | 0% | 10% |
| D | Alive | 100% | 100% | 100% | 100% | 100% | 90% |
|   | KD | 0% | 0% | 0% | 0% | 0% | 10% |
|   | Dead | 0% | 0% | 0% | 0% | 0% | 0% |
| E | Alive | 100% | 100% | 100% | 100% | 100% | 100% |
|   | KD | 0% | 0% | 0% | 0% | 0% | 0% |
|   | Dead | 0% | 0% | 0% | 0% | 0% | 0% |
|   | Avg. % Dead | 0% | 0% | 0% | 0% | 0% | 4% |

TABLE 10B

Direct Application Test Results - Yellow Fever Mosquitoes. Insect Repellent 6 (6 fluid ounces per gallon water)

| Rep | Cond. | Pre-trt | 30 min | 1 hr | 2 hr | 4 hr | 24 hr |
|---|---|---|---|---|---|---|---|
| A | Alive | 10 | 0 | 0 | 0 | 0 | 0 |
|   | KD | 0 | 0 | 1 | 0 | 0 | 0 |
|   | Dead | 0 | 10 | 9 | 10 | 10 | 10 |
| B | Alive | 10 | 0 | 0 | 0 | 0 | 0 |
|   | KD | 0 | 0 | 0 | 0 | 0 | 0 |
|   | Dead | 0 | 10 | 10 | 10 | 10 | 10 |
| C | Alive | 10 | 0 | 0 | 0 | 0 | 0 |
|   | KD | 0 | 0 | 0 | 0 | 0 | 0 |
|   | Dead | 0 | 10 | 10 | 10 | 10 | 10 |
| D | Alive | 10 | 0 | 0 | 0 | 0 | 0 |
|   | KD | 0 | 0 | 0 | 0 | 0 | 0 |
|   | Dead | 0 | 10 | 10 | 10 | 10 | 10 |
| E | Alive | 10 | 0 | 0 | 0 | 0 | 0 |
|   | KD | 0 | 0 | 0 | 0 | 0 | 0 |
|   | Dead | 0 | 10 | 10 | 10 | 10 | 10 |
|   | Avg. Dead | 0 | 10 | 10 | 10 | 10 | 10 |
| A | Alive | 100% | 0% | 0% | 0% | 0% | 0% |
|   | KD | 0% | 0% | 10% | 0% | 0% | 0% |
|   | Dead | 0% | 100% | 90% | 100% | 100% | 100% |
| B | Alive | 100% | 0% | 0% | 0% | 0% | 0% |
|   | KD | 0% | 0% | 0% | 0% | 0% | 0% |
|   | Dead | 0% | 100% | 100% | 100% | 100% | 100% |
| C | Alive | 100% | 0% | 0% | 0% | 0% | 0% |
|   | KD | 0% | 0% | 0% | 0% | 0% | 0% |
|   | Dead | 0% | 100% | 100% | 100% | 100% | 100% |
| D | Alive | 100% | 0% | 0% | 0% | 0% | 0% |
|   | KD | 0% | 0% | 0% | 0% | 0% | 0% |
|   | Dead | 0% | 100% | 100% | 100% | 100% | 100% |

TABLE 10B-continued

Direct Application Test Results - Yellow Fever Mosquitoes.
Insect Repellent 6 (6 fluid ounces per gallon water)

| Rep | Cond. | Pre-trt | 30 min | 1 hr | 2 hr | 4 hr | 24 hr |
|---|---|---|---|---|---|---|---|
| E | Alive | 100% | 0% | 0% | 0% | 0% | 0% |
|   | KD | 0% | 0% | 0% | 0% | 0% | 0% |
|   | Dead | 0% | 100% | 100% | 100% | 100% | 100% |
| Avg. % Dead |  | 0% | 100% | 98% | 100% | 100% | 100% |

TABLE 10C

Direct Application Test Results - Yellow Fever Mosquitoes.
Bifen I/T (0.33 fluid ounces per gallon water)

| Rep | Cond. | Pre-trt | 30 min | 1 hr | 2 hr | 4 hr | 24 hr |
|---|---|---|---|---|---|---|---|
| A | Alive | 10 | 0 | 0 | 0 | 0 | 0 |
|   | KD | 0 | 7 | 8 | 3 | 2 | 0 |
|   | Dead | 0 | 3 | 2 | 7 | 8 | 10 |
| B | Alive | 10 | 0 | 0 | 0 | 0 | 0 |
|   | KD | 0 | 10 | 7 | 4 | 1 | 0 |
|   | Dead | 0 | 0 | 3 | 6 | 9 | 10 |
| C | Alive | 10 | 0 | 0 | 0 | 0 | 0 |
|   | KD | 0 | 9 | 7 | 4 | 2 | 0 |
|   | Dead | 0 | 1 | 3 | 6 | 8 | 10 |
| D | Alive | 10 | 0 | 0 | 0 | 0 | 0 |
|   | KD | 0 | 8 | 5 | 4 | 1 | 0 |
|   | Dead | 0 | 2 | 5 | 6 | 9 | 10 |
| E | Alive | 10 | 0 | 0 | 0 | 0 | 0 |
|   | KD | 0 | 10 | 8 | 7 | 2 | 0 |
|   | Dead | 0 | 0 | 2 | 3 | 8 | 10 |
| Avg. Dead |  | 0 | 1 | 3 | 6 | 8 | 10 |
| A | Alive | 100% | 0% | 0% | 0% | 0% | 0% |
|   | KD | 0% | 70% | 80% | 30% | 20% | 0% |
|   | Dead | 0% | 30% | 20% | 70% | 80% | 100% |
| B | Alive | 100% | 0% | 0% | 0% | 0% | 0% |
|   | KD | 0% | 100% | 70% | 40% | 10% | 0% |
|   | Dead | 0% | 0% | 30% | 60% | 90% | 100% |
| C | Alive | 100% | 0% | 0% | 0% | 0% | 0% |
|   | KD | 0% | 90% | 70% | 40% | 20% | 0% |
|   | Dead | 0% | 10% | 30% | 60% | 80% | 100% |
| D | Alive | 100% | 0% | 0% | 0% | 0% | 0% |
|   | KD | 0% | 80% | 50% | 40% | 10% | 0% |
|   | Dead | 0% | 20% | 50% | 60% | 90% | 100% |
| E | Alive | 100% | 0% | 0% | 0% | 0% | 0% |
|   | KD | 0% | 100% | 80% | 70% | 20% | 0% |
|   | Dead | 0% | 0% | 20% | 30% | 80% | 100% |
| Avg. % Dead |  | 0% | 12% | 30% | 56% | 84% | 100% |

Example 11—Insecticidal Efficiency Direct Spray Applications—Deer Ticks

Insecticide Test Protocol

The objective of this study was to evaluate the efficacy of Insect Repellent 6 and Bifen I/T when sprayed directly on deer ticks *Ixodes scapularis* (adults) under ambient laboratory conditions. For each experiment, 10 insects were placed in 2.25" CPVC cartridge with BioQuip 7250NSW mesh. Next, Insect Repellent 6 was applied to the insects at a rate of 2.5 ft in 1 second spray from a 3-foot distance using Stihl 2.5 gallon gas powered sprayer set on setting 2 with a misting head (1 gal/3000 ft$^2$). Bifenthrin was applied to the insects at a rate of 33 inch length in 1 second spray from 12-inch distance using Snell Sci. compressed air sprayer at 20 pounds per square inch. The number of live, knockdown (KD), and dead insects was counted 30 minutes and 1 hour after insecticide application. One hour after treatment, the insects were transferred to a water moistened cardboard harborage. The insects were monitored 2 hours, 4 hours, and 24 hours after insecticide application. The control groups were untreated. Each experiment was performed in 5 replicates.

Results

The results for the deer tick experiments are presented in Tables 11A-C. None of the ticks in the control group died. In contrast, 100% of the mosquitos sprayed with Insect Repellent 6 were dead within one half hour of insecticide application. The insecticidal efficiency of Insect Repellent 6 was faster than bifenthrin, which took 24 hours to kill 100% of the mosquitos. The Inventors expect Insect Repellent 6 to maintain this insecticidal efficiency for at least four weeks.

TABLE 11A

Direct Application Test Results - Deer Ticks.
Control - Untreated

| Rep | Cond. | Pre-trt | 30 min | 1 hr | 2 hr | 4 hr | 24 hr |
|---|---|---|---|---|---|---|---|
| A | Alive | 10 | 10 | 10 | 10 | 10 | 9 |
|   | KD | 0 | 0 | 0 | 0 | 0 | 1 |
|   | Dead | 0 | 0 | 0 | 0 | 0 | 0 |
| B | Alive | 10 | 10 | 10 | 10 | 10 | 7 |
|   | KD | 0 | 0 | 0 | 0 | 0 | 2 |
|   | Dead | 0 | 0 | 0 | 0 | 0 | 1 |
| C | Alive | 10 | 10 | 10 | 10 | 10 | 7 |
|   | KD | 0 | 0 | 0 | 0 | 0 | 2 |
|   | Dead | 0 | 0 | 0 | 0 | 0 | 1 |
| D | Alive | 10 | 10 | 10 | 10 | 10 | 7 |
|   | KD | 0 | 0 | 0 | 0 | 0 | 3 |
|   | Dead | 0 | 0 | 0 | 0 | 0 | 0 |
| E | Alive | 10 | 10 | 10 | 10 | 10 | 9 |
|   | KD | 0 | 0 | 0 | 0 | 0 | 1 |
|   | Dead | 0 | 0 | 0 | 0 | 0 | 0 |
| Avg. Dead |  | 0 | 0 | 0 | 0 | 0 | 0 |
| A | Alive | 100% | 100% | 100% | 100% | 100% | 90% |
|   | KD | 0% | 0% | 0% | 0% | 0% | 10% |
|   | Dead | 0% | 0% | 0% | 0% | 0% | 0% |
| B | Alive | 100% | 100% | 100% | 100% | 100% | 70% |
|   | KD | 0% | 0% | 0% | 0% | 0% | 20% |
|   | Dead | 0% | 0% | 0% | 0% | 0% | 10% |
| C | Alive | 100% | 100% | 100% | 100% | 100% | 70% |
|   | KD | 0% | 0% | 0% | 0% | 0% | 20% |
|   | Dead | 0% | 0% | 0% | 0% | 0% | 10% |
| D | Alive | 100% | 100% | 100% | 100% | 100% | 70% |
|   | KD | 0% | 0% | 0% | 0% | 0% | 30% |
|   | Dead | 0% | 0% | 0% | 0% | 0% | 0% |
| E | Alive | 100% | 100% | 100% | 100% | 100% | 90% |
|   | KD | 0% | 0% | 0% | 0% | 0% | 10% |
|   | Dead | 0% | 0% | 0% | 0% | 0% | 0% |
| Avg. % Dead |  | 0% | 0% | 0% | 0% | 0% | 4% |

TABLE 11B

Direct Application Test Results - Deer Ticks.
Insect Repellent 6 (6 fluid ounces per gallon water)

| Rep | Cond. | Pre-trt | 30 min | 1 hr | 2 hr | 4 hr | 24 hr |
|---|---|---|---|---|---|---|---|
| A | Alive | 10 | 0 | 0 | 0 | 0 | 0 |
|   | KD | 0 | 2 | 0 | 3 | 0 | 0 |
|   | Dead | 0 | 8 | 10 | 7 | 10 | 10 |
| B | Alive | 10 | 0 | 0 | 0 | 0 | 0 |
|   | KD | 0 | 2 | 4 | 1 | 0 | 0 |
|   | Dead | 0 | 8 | 6 | 9 | 10 | 10 |
| C | Alive | 10 | 0 | 0 | 0 | 0 | 0 |
|   | KD | 0 | 1 | 2 | 0 | 0 | 0 |
|   | Dead | 0 | 9 | 8 | 10 | 10 | 10 |
| D | Alive | 10 | 0 | 0 | 0 | 0 | 0 |
|   | KD | 0 | 1 | 1 | 0 | 0 | 0 |
|   | Dead | 0 | 9 | 9 | 10 | 10 | 10 |
| E | Alive | 10 | 0 | 0 | 0 | 0 | 0 |
|   | KD | 0 | 0 | 2 | 0 | 0 | 0 |
|   | Dead | 0 | 10 | 8 | 10 | 10 | 10 |
| Avg. Dead |  | 0 | 9 | 8 | 9 | 10 | 10 |

TABLE 11B-continued

Direct Application Test Results - Deer Ticks.
Insect Repellent 6 (6 fluid ounces per gallon water)

| Rep | Cond. | Pre-trt | 30 min | 1 hr | 2 hr | 4 hr | 24 hr |
|---|---|---|---|---|---|---|---|
| A | Alive | 100% | 0% | 0% | 0% | 0% | 0% |
|   | KD | 0% | 20% | 0% | 30% | 0% | 0% |
|   | Dead | 0% | 80% | 100% | 70% | 100% | 100% |
| B | Alive | 100% | 0% | 0% | 0% | 0% | 0% |
|   | KD | 0% | 20% | 40% | 10% | 0% | 0% |
|   | Dead | 0% | 80% | 60% | 90% | 100% | 100% |
| C | Alive | 100% | 0% | 0% | 0% | 0% | 0% |
|   | KD | 0% | 10% | 20% | 0% | 0% | 0% |
|   | Dead | 0% | 90% | 80% | 100% | 100% | 100% |
| D | Alive | 100% | 0% | 0% | 0% | 0% | 0% |
|   | KD | 0% | 10% | 10% | 0% | 0% | 0% |
|   | Dead | 0% | 90% | 90% | 100% | 100% | 100% |
| E | Alive | 100% | 0% | 0% | 0% | 0% | 0% |
|   | KD | 0% | 0% | 20% | 0% | 0% | 0% |
|   | Dead | 0% | 100% | 80% | 100% | 100% | 100% |
| Avg. % Dead |  | 0% | 88% | 82% | 92% | 100% | 100% |

TABLE 11C

Direct Application Test Results - Deer Ticks.
Bifen I/T (0.33 fluid ounces per gallon water)

| Rep | Cond. | Pre-trt | 30 min | 1 hr | 2 hr | 4 hr | 24 hr |
|---|---|---|---|---|---|---|---|
| A | Alive | 10 | 0 | 0 | 0 | 0 | 0 |
|   | KD | 0 | 6 | 7 | 10 | 8 | 3 |
|   | Dead | 0 | 4 | 3 | 0 | 2 | 7 |
| B | Alive | 10 | 0 | 0 | 0 | 0 | 0 |
|   | KD | 0 | 5 | 8 | 10 | 8 | 0 |
|   | Dead | 0 | 5 | 2 | 0 | 2 | 10 |
| C | Alive | 10 | 0 | 0 | 0 | 0 | 0 |
|   | KD | 0 | 10 | 8 | 10 | 10 | 0 |
|   | Dead | 0 | 0 | 2 | 0 | 0 | 10 |
| D | Alive | 10 | 4 | 0 | 0 | 0 | 0 |
|   | KD | 0 | 6 | 10 | 10 | 2 | 0 |
|   | Dead | 0 | 0 | 0 | 0 | 8 | 10 |
| E | Alive | 10 | 0 | 0 | 0 | 0 | 0 |
|   | KD | 0 | 8 | 10 | 10 | 0 | 0 |
|   | Dead | 0 | 2 | 0 | 0 | 10 | 10 |
| Avg. Dead |  | 0 | 2 | 1 | 0 | 4 | 9 |
| A | Alive | 100% | 0% | 0% | 0% | 0% | 0% |
|   | KD | 0% | 60% | 70% | 100% | 80% | 30% |
|   | Dead | 0% | 40% | 30% | 0% | 20% | 70% |
| B | Alive | 100% | 0% | 0% | 0% | 0% | 0% |
|   | KD | 0% | 50% | 80% | 100% | 80% | 0% |
|   | Dead | 0% | 50% | 20% | 0% | 20% | 100% |
| C | Alive | 100% | 0% | 0% | 0% | 0% | 0% |
|   | KD | 0% | 100% | 80% | 100% | 100% | 0% |
|   | Dead | 0% | 0% | 20% | 0% | 0% | 100% |
| D | Alive | 100% | 40% | 0% | 0% | 0% | 0% |
|   | KD | 0% | 60% | 100% | 100% | 20% | 0% |
|   | Dead | 0% | 0% | 0% | 0% | 80% | 100% |
| E | Alive | 100% | 0% | 0% | 0% | 0% | 0% |
|   | KD | 0% | 80% | 100% | 100% | 0% | 0% |
|   | Dead | 0% | 20% | 0% | 0% | 100% | 100% |
| Avg. % Dead |  | 0% | 22% | 14% | 0% | 44% | 94% |

Example 12—Residual Insecticidal Efficiency

Insecticide Test Protocol

The objective of the study will be to evaluate the residual efficacy of Insect Repellent 6 and bifenthrin on yellow fever mosquitoes *Aedes aegypti* (adult females) and deer ticks *Ixodes scapularis* (adults). The test protocol will be conducted by: (1) applying the test substances to the surfaces, e.g., Insect Repellent 6 applied with a fogger 4 oz/gallon mix, 1 gal/3000 ft$^2$ and bifenthrin applied per instructions on product label to Camelia Leaves on 4 inch by 4 inch wooden panel, covered with mesh cartridge, (2) allowing the surfaces to dry, e.g., one hour and 21 days outside, sheltered from any rainfall, (3) exposing groups of 10 insects to the surfaces for the appropriate exposure duration, (4) transferring the insects to untreated containers with food/water, and (5) monitoring the insects for mortality by recording the number of alive, knockdown (KD), and dead insects after exposure to the surfaces. Control experiments will employ untreated surfaces. Each experiment will be performed in 5 replicates of 10 insects per replicate. The insects will be evaluated under ambient laboratory conditions as follows. Insects will be held on the surface for 1 hour (mosquitoes) or 4 hours (ticks) and then will be transferred into clean post-treatment arenas for the remaining observations. The number of alive, knockdown (KD), and dead insects will be recorded, e.g., prior to exposure (pre-trt), at 30 minutes, 1 hour, 2 hours, 4 hours, 24 hours, and daily as needed after exposure for each aged evaluation.

The Inventors expect Insect Repellent 6 to exhibit 100% insecticidal efficiency against both mosquitos and ticks within one hour of exposure at day 0 and to maintain this insecticidal efficiency at day 21.

Example 13—Residual Repellency

Insecticide Test Protocol

The objective of the study will be to evaluate the repellency of Insect Repellent 6. The test protocol will be conducted using 12-inch by 12-inch by 12-inch mesh cages to contain yellow fever mosquitoes *Aedes aegypti* (adult females). The left and right mesh side panels of the cages will be replaced with wooden panels. The panels will be covered with Camelia leaves. One panel will be treated with Insect Repellent 6 (4 oz/gallon mix, 1 gal/3000 ft$^2$) and the other panel will not. Treated sides will be alternated between replicates (4 replicates of 100 insects per replicate). The insects will be evaluated under ambient laboratory conditions.

The location of the insects on either the treated side or the untreated side will be recorded at 30-minute intervals for 4 hours. The average landing rate on the treated and untreated sides for each replicate will be compared to determine the percentage of mosquitoes landed on each surface type. The Henderson-Tilton formula will be used to compare the Untreated Control test substance against the Stop the Bite Test Substance.

The Inventors expect Insect Repellent 6 to exhibit 70% to 100% mosquito repellency at day 0 and to maintain at least 40% mosquito repellency at day 21.

The invention claimed is:

1. An insect repellent comprising:
   0.05% to 8% by weight lemongrass;
   0.05% to 12% by weight castor oil;
   0.05% to 7% by weight cedarwood oil;
   0.05% to 6% by weight geraniol;
   0.01% to 4% by weight sodium lauryl sulfate;
   0.05% to 2% by weight corn oil;
   0.01% to 10% by weight oleic acid;
   0.05% to 20% by weight soaps;
   0.05% to 8% by weight monolaurin; and
   balance water 50% to 80% by weight.

2. The insect repellent of claim 1, wherein the insect repellent further comprises 0.01% to 8% by weight mint oil.

3. The insect repellent of claim 2, wherein the mint oil comprises Montana mint oil.

4. The insect repellent of claim 1, wherein the lemongrass comprises Guatemalan lemongrass.

5. The insect repellent of claim 1, wherein the cedarwood oil comprises *Juniperus virginiana* cedarwood oil.

6. The insect repellent of claim 1, further comprising 0.01% to 8% by weight wintergreen oil.

7. The insect repellent of claim 1, further comprising 0.01% to 5% by weight garlic oil.

8. The insect repellent of claim 1, further comprising 0.01% to 8% by weight spearmint oil.

9. The insect repellent of claim 1, wherein the insect repellent comprises 0.05% to 10% by weight castor oil.

10. A method of killing insects in a treatment area comprising:
    applying an insect repellent of claim 1 to the treatment area in an amount effective to kill insects in the treatment area.

11. The method of claim 10, wherein the insect repellant is applied in an amount effective to kill at least 80% of insects in the treatment area one hour after applying the insect repellent to the treatment area.

12. The method of claim 10, wherein the insect repellent is applied directly to the insect.

13. A method of preventing insect reproduction in a treatment area comprising:
    applying an insect repellent of claim 1 to the treatment area in an amount effective to at least one of (a) disrupt an insect egg cycle and (b) kill an insect larva in the treated area.

14. The method of claim 13, wherein the treatment area comprises a residential landscape, a commercial landscape, or an area that comprises a water feature, a lake or a stream.

15. A method of repelling insects from a surface, comprising applying the insect repellent of claim 1 to a surface in an amount effective to repel insects from the surface.

16. The method of claim 15, wherein the insect repellent is applied in an amount effective to repel at least 85% of insects from the surface one hour after applying the insect repellent to the surface.

17. The method of claim 15, wherein the surface is selected from the group consisting of a soil surface, a plant surface, and an exterior building surface.

18. The method of claim 15, further comprising diluting 0.5 ounces, 1 ounce, 1.5 ounces, 2 ounces, 2.5 ounces, 3 ounces, 3.5 ounces, 4 ounces, 4.5 ounces, 5 ounces, 5.5 ounces, 6 ounces, 6.5 ounces, 7 ounces, about 7.5 ounces, 8 ounces, 8.5 ounces, 9 ounces, 9.5 ounces, 10 ounces, 10.5 ounces, 11 ounces, 11.5 ounces, 12 ounces, 12.5 ounces, 13 ounces, 13.5 ounces, 14 ounces, 14.5 ounces, 15 ounces, 15.5 ounces, 16 ounces, 16.5 ounces, 17 ounces, 17.5 ounces, 18 ounces, 18.5 ounces, 19 ounces, 19.5, or 20 ounces of an insect repellent concentrate with water to make a gallon of the insect repellent.

19. The method of claim 15, wherein applying the insect repellent comprises spraying.

20. The method of claim 15, wherein the insect is a mosquito or a tick.

* * * * *

UNITED STATES PATENT AND TRADEMARK OFFICE
CERTIFICATE OF CORRECTION

| | |
|---|---|
| PATENT NO. | : 10,813,362 B2 |
| APPLICATION NO. | : 16/294140 |
| DATED | : October 27, 2020 |
| INVENTOR(S) | : Neil B. Teevan and Lanny Weaver |

Page 1 of 1

It is certified that error appears in the above-identified patent and that said Letters Patent is hereby corrected as shown below:

In the Specification

Column 4, Line 17 - Replace "9%" with -- 19% --.

Column 4, Line 19 - Replace the second "38%" with -- 39% --.

Column 4, Line 40 - Replace "9%" with -- 19% --.

Column 4, Line 42 - Replace the second "38%" with -- 39% --.

Column 5, Line 18 - Replace "0.0%" with -- 0.01% --.

Column 17, Line 4 - Replace "30 days weeks" with -- 30 days --.

Column 20, Line 31 - Delete "Insectide Concentrate".

Signed and Sealed this
Twenty-ninth Day of December, 2020

Andrei Iancu
*Director of the United States Patent and Trademark Office*